UNITED STATES PATENT OFFICE.

JOHN A. JUST, OF SYRACUSE, NEW YORK, ASSIGNOR TO THE JUST MINING & EXTRACTION CO., OF SYRACUSE, NEW YORK, A CORPORATION OF NEW YORK.

PROCESS OF TREATING GOLD AND GOLD-SILVER ORES.

No. 841,983.      Specification of Letters Patent.      Patented Jan. 22, 1907.

Application filed January 27, 1906. Serial No. 298,187.

*To all whom it may concern:*

Be it known that I, JOHN A. JUST, a citizen of the United States, and a resident of Syracuse, New York, have invented certain new and useful Improvements in Processes for Treating Gold and Gold-Silver Ores, of which the following is a specification.

This invention relates to the extraction of the precious metals from the ores or materials containing same, and has for its objects to improve upon the cyanid process and enable the precious metals to be recovered from rebellious ores by cyaniding which do not yield satisfactorily to amalgamation, chlorination, or cyaniding and similar hydro-metallurgical processes.

The invention consists of a process for carrying out the above objects embodying the features and steps hereinafter fully described and claimed in this specification.

While the chemical reactions that take place between gold and cyanid solutions are known, the reactions between cyanogen and other elements are as yet but slightly known, for which reason the cyanid process in particular has not been fully developed, and its scope is at the present time limited to a certain class of ores, like the free-milling description. The character of the ore exerts an influence on the rate with which cyanid will dissolve the gold.

In the extraction of gold by chlorination the process is based upon the property of chlorin gas to transform metallic gold into soluble chlorid of gold. The gold must always be present in a metallic state. Quartz free from other earths and sulfurets containing very fine gold can be subjected to chlorination. Sulfureted ores require perfect roasting. The presence of lead makes a careful roasting necessary, as during such roasting processes all metals, except gold, must be transformed into oxids. Sulfates are injurious. Subjecting some classes of ores not yielding to chlorination to my process and removing the soluble salts formed will render the extraction successful without subjecting such ore to the roasting process. Gold-silver ores do not give satisfactory extraction with chlorin, since the insoluble silver chlorid formed mechanically coats the gold and retards the free action of chlorin.

In order to fully comprehend the aim of this invention, I will point out the causes of the failure of a satisfactory recovery of precious metals in certain kinds of ores. If ores are treated in such manner as to remove the cause which retards the action of the extracting medium and prevents the solution of the precious metals, such treatment paves the way for a successful extraction of values from rebellious ores and is the object of this process.

In order to fully explain this invention and show the complicated chemical changes involved, owing to the presence of the various baser materials in the ore which consume the extracting agent or directly retard a successful recovery of the precious metals, or excessively consume the extraction agent with a very low extraction of precious metals, it is necessary to review the various substances that are detrimental in cyanid practice.

Since the process aims principally to improve the cyanid extraction of certain ores, I will review the various substances which exert a most harmful influence in the cyanid process and the cause, and also some substances which remain inert to the extracting medium. Arsenic has no injurious effect on cyanid solutions. Ores containing silver are more or less soluble in cyanid solutions, but not to the same extent as gold. According to my invention my first treatment removes the silver and leaves the gold exposed for the subsequent action of the cyanid solution. The chlorid of silver and the subsulfid of silver (AgS) are readily soluble; but silver ores, as a rule, are slowly acted on by cyanid solution. The base metal ores—those containing iron, zinc, lead, copper, and antimony, combined with sulfur, arsenic, or tellurium—cause loss of cyanogen by uniting with the cyanid to form soluble cyanids. The loss in this case can be somewhat reduced by the use of weak cyanid solutions. The affinity of cyanogen is greater for gold and silver than for the baser metals. The action of weak cyanid solutions on lead and iron is practically nothing and on copper or zinc in the metallic state with gold present is small; but when their hydrated oxids or carbonates are present in the ore the loss of cyanogen will be so great as to render the cyanid process useless.

Such ore having passed my preliminary treatment will cyanid successfully. Partially oxidized pyritic ores cause a loss of cyanogen, and this is corrected by my preliminary process. Iron pyrites when exposed to the elements above water-level is often changed to ferric oxid. Ferric oxid does not decompose solutions of cyanid, but its presence often causes very fine slimes which retard mechanically the operations of properly draining, filtering, washing, and otherwise handling the extracted material, causing a loss of values. Sulfid of iron ($FeS_2$) acts but very little on potassium cyanid solutions. The harmful iron salts enter in solution and are removed by washing from the ore in my preliminary step.

*Loss from minerals soluble in cyanid solutions.*—Potassium cyanid acts on the oxid, sulfid, and carbonate ores of copper, and the sulfids of antimony and bismuth. The loss of cyanogen which will occur when ores of this description are treated by the cyanid process depends on the quantity of these minerals present in the ore. The only remedy, which is only partial against this evil, is the use of a very weak solution of cyanid of about 0.25 per cent. strength. More gold and less copper will then be taken up. The difficulty due to the presence of bismuth, antimony, &c., in combination or as an alloy with the gold, may sometimes be overcome by fine grinding and long contact with the cyanid solution; but the usual method is to treat the ore to a preliminary roast, which converts the gold into a condition in which it is really attacked by cyanid solutions. Any sulfate of alumina must be washed out, as it would decompose large quantities of potassium cyanid. Alumina that may be in the ore as hydrated oxid reacts upon potassium cyanid, forming aluminate of potassium and sets free hydrocyanic acid. Cobalt exerts a harmful action and causes loss in connection with cyanids. It dissolves readily in cyanid solutions, thus consuming or extracting cyanogen from the solution. It is also interesting to note that the dissolved cobalt will be precipitated with the gold and silver on the zinc in the extractor-box, and, like copper, will interfere with the precipitation of the gold. Antimonite, the gray sesqui-sulfid of antimony, is also readily acted on by weak cyanid solutions and is frequently met with in the gold-bearing ores of the Thames and Reefton gold fields. The presence of a small percentage of antimonite in the large accumulations of tailings at Boatman's creek near Reefton is said to have caused all attempts to treat them to end in failure, chiefly owing to the large consumption of cyanid and low rate of extraction.

The formation of alkaline sulfids during the cyanid process as applied to ores containing stibnite and copper sulfids is undoubtedly the chief cause of the loss of gold that so often occurs in that process. These objectionable substances are rendered soluble or inert by my process and the soluble salts are removed by washing. With roasted (oxidized) ores, as malachite or dioptase, a loss of available cyanid will necessarily occur, and in addition, also, a loss of gold and a still greater loss of silver in the proportion to the quantities of extraneous matter present.

It has long been remarked that a small percentage of a soluble sulfid present in the cyanid process greatly delays the dissolution of gold. This no doubt is partly owing to the absorption of oxygen from the solution by the sulfid, for gold sulfid is freely soluble in KCN. Silver sulfid is far less soluble than gold sulfid, so that native gold containing twenty per cent. of silver is treated, a film almost insoluble in dilute cyanid solutions may be formed and extraction thus retarded. All these difficulties disappear if the sulfids are oxidized and removed by the treatment of my process.

*Action of potassium cyanid on metallic salts and minerals occurring in ores.*—The ordinary gangue of ores (viz., silica and silicate of the alkalies and alkaline earths) exercise no direct influence on the cyanid solution. The carbonates of the alkaline earths are probably without influence. The decomposing effects of sulfids of the heavy metals vary with the physical state of the sulfids. Thus in the different ores the decomposition of cyanid (or loss) varies from three to fifty pounds per ton of ore. Sulfid of copper and zinc are rapidly dissolved and cause loss. Oxid of copper and zinc freshly precipitated are strongly acted on by cyanid solutions, but when heated to dull redness they are not acted upon at all.

*Action of potassium cyanid on oxidized pyrites.*—When pyrites occurs in tailings which have been subjected to the action of the weather for some time before treatment, compounds are formed which are more or less prejudicial to the solution than the sulfids themselves. Sulfid of iron ($FeS_2$) is oxidized by air and water, ferrous sulfate and free sulfuric acid being formed thus:

$$FeS_2 + H_2O + 7O = FeSO_4 + H_2SO_4.$$

The ferrous sulfate suffers further oxidation and normal ferric sulfate, $Fe_2(SO_4)_3$ is produced which eventually loses acid and becomes a soluble basic sulfate ($Fe_2O_3 2SO_3$.) Other basic salts of complex and unknown composition appear to be formed also. The main stages in the oxidation of pyrites or marcasite are about as follows: First, $FeS_2$, iron pyrites; second, $FeS+S$, ferrous sulfid and sulfur; third, $FeSO_4 + H_2SO_4$, ferrous sulfate and sulfuric acid; fourth, $Fe_2(SO_4)_3$, ferric sulfate; fifth, $2Fe_2O_3 SO_3$, insoluble basic ferric sulfate; sixth, $Fe_2O_3$, ferric oxid. Whether these decompositions proceed in order or not, it is certain that all these products named are formed in weathered tailings. In the presence of such oxidized copper and iron pyrites the following reactions take place when brought in contact with cyanid solutions:

First. The free sulfuric acid liberates hydrocyanic acid thus:

$$H_2SO_4 + 2KCN = K_2SO_4 + 2HCN.$$

Second. Ferrous sulfate reacts on the cyanid forming ferrous cyanid, which dissolves in the excess of potassium cyanid so that it does not appear in the free state, thus:

$$FeSO_4 + 2KCN = Fe(CN)_2 + K_2SO_4,$$

and $$Fe(CN)_2 + 4KCN = K_4Fe(CN)_6.$$

The potassium ferrocyanid, if sufficient acid is present, reacts with fresh ferrous sulfate, forming a bluish-white precipitate, thus:

$$FeSO_4 + K_4Fe(CN)_6 = K_2Fe_2(CN)_6 + K_2SO_4.$$

This precipitate oxidizes in the air to Prussian blue if free acid is present thus:

$$4K_2Fe_2(CN)_6 + O_2 + 2H_2SO_4 =$$
$$3Fe(CN)_2.2Fe_2(CN)_6 + K_4Fe(CN)_6 + 2K_2SO_4 + 2H_2O.$$
Prussian blue.

Both these precipitates are decomposed by potash or soda, and therefore cannot be formed in their presence. These reactions may be represented as follows:

$$K_2Fe_2(CN)_6 + 2KOH = K_4Fe(CN)_6 + Fe(OH)_2$$

$$3Fe(CN)_2.2Fe_2(CN)_6 + 12NaOH =$$
$$3Na_4Fe(CN)_6 + 2Fe_2(OH)_6.$$

Consequently if free acid is not present Prussian blue is hardly formed at all, as the solution soon besomes alkaline and the precipitate is decomposed as fast as it is formed. It follows from these reactions that whenever the color of Prussian blue is visible in the vats or on the surface of the waste tailings heap an enormous waste of cyanid must have taken place.

Third. Ferric sulfates are decomposed by potassium cyanid, hydrocyanic acid being evolved and ferric hydrate precipitated.

Fourth. A mixture of ferrous and ferric sulfates produces Prussian blue by reacting with potassium cyanid, ferrocyanid of potassium being formed at first as above. The equation is—

$$3K_4Fe(CN)_6 + 2Fe_2(SO_4)_3 =$$
$$3Fe(CN)_6.2Fe_2(CN)_6 + 6K_2SO_4.$$

Here again the waste of cyanid is prevented by keeping the solutions alkaline.

Fifth. Sulfate of copper ($CuSO_4$) acts differently from $FeSO_4$, cuprous cyanid $Cu_2(CN)_2$ being formed, soluble in excess of KCN to $K_2Cu_2(CN)_4$, a compound very apt to decompose. Copper sulfate also gives a precipitate with potassium ferrocyanid. Thus $$K_4Fe(CN)_6 + CuSO_4 = K_2CuFe(CN)_6 + K_2SO_4.$$

Sixth. Ferrous hydrate, when formed as above, is instantly dissolved in KCN. Thus $$Fe(OH)_2 + 6 KCN = K_4Fe(CN)_6 + 2KOH.$$

Ferric hydrate, however formed, does not act on potassium cyanid. Iron salts exist in the ferric state in my process, and if traces should escape removal by washing only a small amount of ferric hydrate could be formed in the ore after adding the lime to render it alkaline. It must be remembered that ferric oxid has an undesirable physical action, as it collects in a gelatinous mass on the filters, causing slimes and checking the flow of liquid. Copper and zinc in the condition of hydrates or carbonates are quickly dissolved in the presence of precious metals. If sulfates of these metals are formed in an ore containing limestone or clay, double decomposition occurs, with the production of sulfate of lime or alumina and oxids or carbonates of the heavy metals, which are dissolved by the cyanid. Thus $$ZnSO_4 + CaCO_3 = ZnCO_3 + CaSO_4.$$

$$ZnCO_3 + KCN = Zn(CN)_2 + K_2CO_3.$$

*Effect of Alkalies.*—Since acid causes loss of cyanogen, an obvious method of reducing the loss from this source is to add alkali in some form. Before doing this the free sulfuric acid and soluble salts should be removed by leaching with water, and then a solution of caustic soda, or, preferably, lime, is run into the ore, and after standing for some time may be drained off and followed by the cyanid solution. Any soluble basic iron salts present are thus converted into ferric hydrate and soluble sulfates. Thus $$Fe_2O_3.2SO_3 + 4NaOH + H_2O =$$
$$Fe_2(OH)_6 + 2Na_2SO_4.$$

$$2Fe_2O_3.SO_3 + 4NaOH + 4H_2O =$$
$$2Fe_2(OHH)_6 + 2Na_2SO_4.$$

Leaching with water removes the excess of alkali. This cannot be done completely without great expense in practice. Therefore lime is preferred and used as the alkaline medium. An excess of lime is less detrimental than soda to the cyanid solution and lime does not attack the zinc. It suffices for the material to just react alkaline decidedly, and a great excess of lime is both wasteful and harmful to the cyanid solution. Wash until no coloration is obtained by ammonium sulfid, so as to remove the soluble salts as far as possible. The above will point out the chief causes of loss as well as impossibility of commercial results of certain classes of gold and gold-silver ores and will serve as a useful guide to point out clearly the real cyanid consuming and retarding factors, or the cyanids.

According to my invention I give the ore a preliminary treatment by means of which substantially all the substances which retard the extraction and consume the extracting materials are removed.

The following is a description of preliminary treatment: The ground ore is subjected to the following treatment in order to render the objectionable minerals in the ore soluble and then to remove the soluble salts formed by leaching and washing. The cleaned sands are then ready for the regular cyanid treatment. The ore to be treated is first reduced to a suitable mesh and placed in a suitable vessel. Dilute sulfuric acid is then added thereto sufficient to cover the ore. An oxidizing agent or oxygen salt is preferably added to the sulfuric acid and the mass heated. According to the nature of the ore more or less strong acid is required or more or less oxidizing agent should be employed, and also the time of heating required to render the extraneous minerals soluble or inert depends upon the amount of such constituents in the ore. Silver present in quantity in the gold-silver ores is thus removed and goes into solution, while the porous and readily-soluble gold will remain in the sands to be extracted in the subsequent process of extraction.

A good working formula for an average ore not readily yielding to the ordinary treatment of cyaniding is as follows: To one part of finely-ground ore or tailings contained in a suitable vessel three parts of sulfuric acid of, say, 1.25 specific gravity, more or less, are added and the two thoroughly mixed. Heat is then applied, and after 1.5 to two hours' heating the required amount of an oxygen salt is added gradually, (such as manganese dioxid, sodium nitrate.) A soluble oxygen salt, like sodium nitrate, for instance, may be, if desired, added at the start. In certain cases where limited amounts of silver appear to be alloyed with the gold it happens that owing to the insolubility of silver cyanid the gold-silver alloy is coated over and the solution of gold in cyanid of potassium is retarded or entirely prevented. In such cases an estimated amount of a soluble chlorid—as, for instance, sodium chlorid—is added at this point and during the preliminary treatment. Since $H_2SO_4$ is present the sodium, chlorid is decomposed and hydrochloric acid is formed, or, in the presence of oxygen, chlorin is formed. Either one will react on the silver, forming silver chlorid. This will form silver chlorid, which is perfectly soluble in cyanid solutions, thus exposing the gold to the extraction medium, which then readily dissolves it. This in many instances renders an otherwise unsatisfactory extraction complete. The heating and evaporation is now continued until the mass becomes concentrated and fairly thick. The total time for heating ordinary rebellious ores varies from three to five hours, and the final temperature varies from 280° to 365° Fahrenheit. However, with some description of ores and a suitable oxygen salt a temperature of 212° to 250° Fahrenheit is often sufficient to bring about the desired result in the above range of time. It also depends upon the amount of silver present in the gold-silver ore. After the evaporation or concentration is finished the mass is allowed to cool for fifteen to thirty minutes after the source of heat has been removed. Then sufficient water or acid-water from previous washings is added to bring the total volume to approximately four times the ore taken. After mixing the whole thoroughly the sands are separated from the liquid by filtration and the residue (sands) washed with water or acid-water from previous washings until the sands are free from soluble silver salts and practically free from acid and other soluble salts. The main filtrate and the first wash are preferably collected together and either treated at once with sulfureted hydrogen (or other suitable agent to separate the silver, &c.) or else allowed to stand until the salts (that will) crystallize out and then treat with sulfureted hydrogen. The subsequent washes on the sands are reserved for future use and used instead of plain water for washing. The precipitated sulfids are washed once or twice with small amounts of water and the washings added to the main filtrate. From the sulfids obtained the silver is separated by any of the usual methods.

For cyaniding the sands from the acid treatment are well mixed and a sample taken and titrated to show the amount of free acid and salts present. The entire mass is then rendered alkaline with the required amount of lime (CaO) and then subjected to the usual known cyanid treatment, in which a thirty-five one-hundredths per cent. or one-half per cent. solution of cyanid is added to cover the sands in proportion of about three of cyanid solution to one of sand.

The sulfuric acid is, with the exception of a small loss, recovered for continuous reuse. The process is cheap and simple and adds but little to the expense of the regular cyanid process, whereas precious metals are recovered that cannot be reached in the regular process of amalgamation, chlorination, or cyanidation.

It is evident that the proportions of the chemicals used herein given may be varied without departing from the spirit of this invention. It is also obvious that different characters of ores require more or less different adjustments of the quantity of chemicals to obtain the desired effect.

I claim, and desire to obtain by Letters Patent, the following:

1. A process of recovering precious metals from ores or materials containing said metals, which consists in first treating said ores and materials with sulfuric acid in the presence of an oxygen salt to form salts with the baser substances which substances would retard the extraction and consume the extracting material in the subsequent cyaniding treatment.

2. A process of recovering precious metals from ores or materials containing said metals, which consists in first treating said ores and materials with sulfuric acid and a suitable chlorid in order to remove the silver naturally alloyed with the gold, and then cyaniding the residue.

3. A process of recovering precious metals from ores or materials containing said metals, which consists in first treating said ores or materials with sulfuric acid and a suitable chlorid in the presence of an oxygen salt, in order to remove the silver naturally alloyed with the gold, and then cyaniding the residue.

4. A process of recovering precious metals from ores or materials containing said metals, which consists in first treating the ores or materials with an acid capable of forming salts with the baser substances which would retard the extraction and consume the extracting material in the subsequent cyaniding treatment, then removing the free acid containing said salts and finally cyaniding the remaining sands for the recovery of precious metals.

5. A process of recovering precious metals from ores or materials containing said metals, which consists in first treating the ores or materials with an acid capable of forming salts with the baser substances which would retard the extraction and consume the extracting material in the subsequent cyaniding treatment, then removing the free acid containing said salts, washing the residue and rendering the same alkaline, and finally subjecting the alkaline sands to cyanidation, withdrawing the cyanid liquor and recovering the metals.

In testimony whereof I have signed this specification in the presence of two subscribing witnesses.

JOHN A. JUST.

Witnesses:
  M. L. MANTELL,
  ARTHUR L. BRADLEY.